United States Patent Office 3,048,082
Patented Aug. 7, 1962

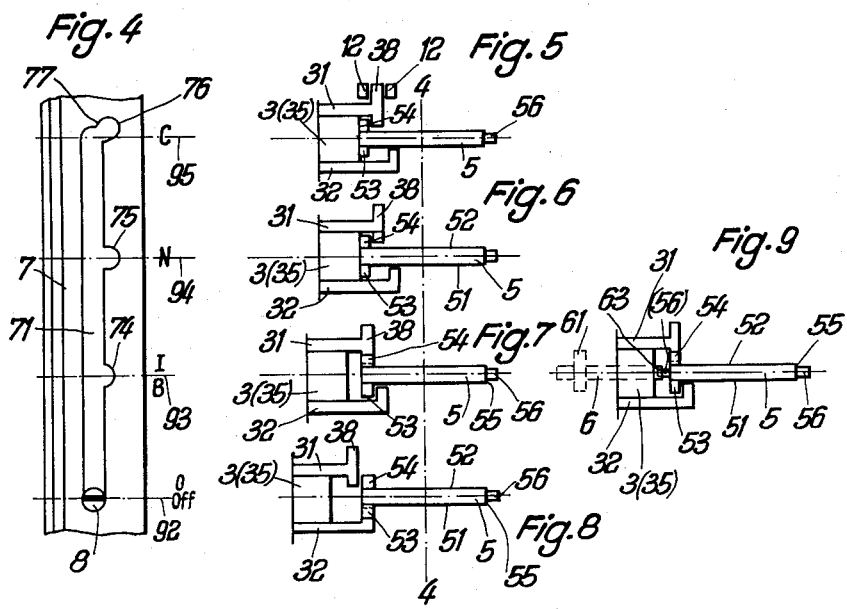
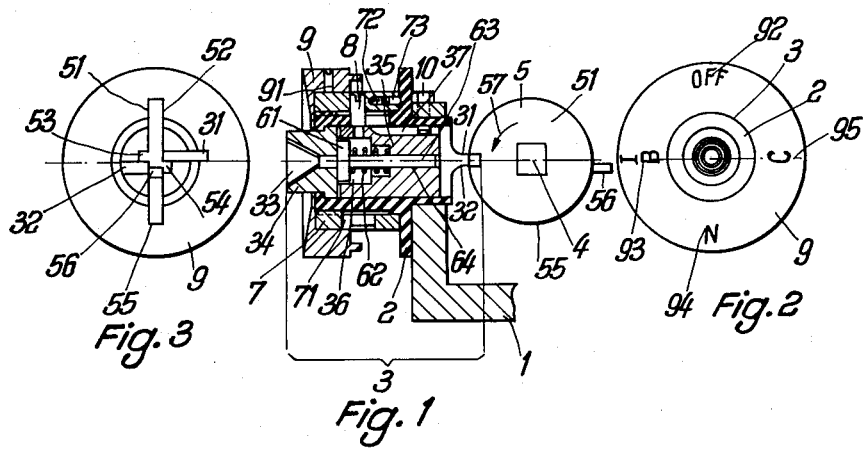

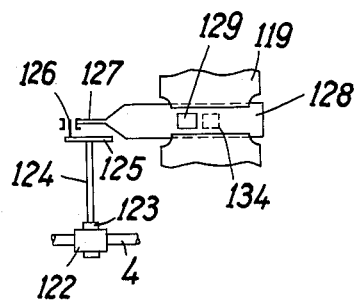
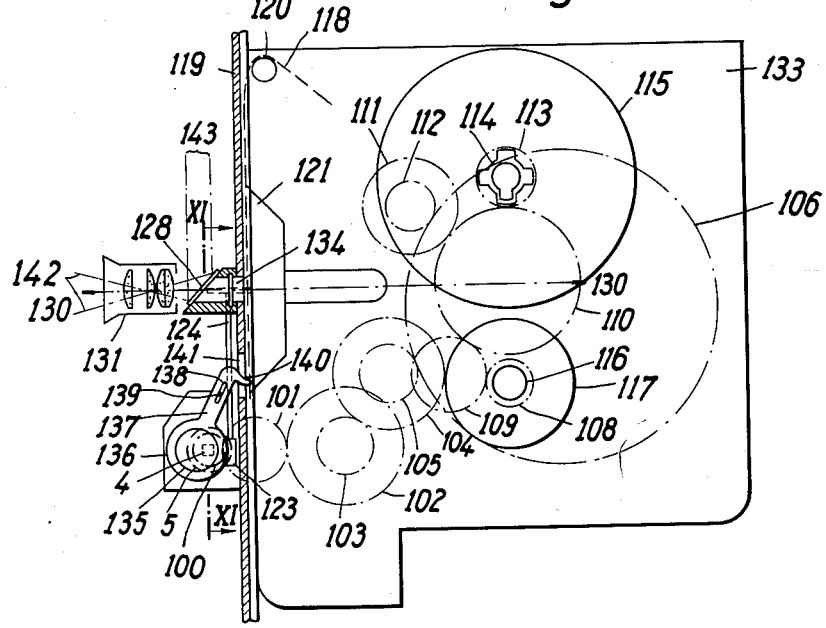

3,048,082
TRANSMISSION CONTROL FOR MOTION
PICTURE CAMERAS
Alfredo Ferrari and Adolf Gasser, Mauren, Liechtenstein, assignors to Contina Bureaux- und Rechenmaschinenfabrik, Aktiengesellschaft, Mauren, Liechtenstein
Filed Sept. 8, 1959, Ser. No. 838,758
Claims priority, application Austria Sept. 13, 1958
8 Claims. (Cl. 88—18)

Devices for selectively setting the transmission of motion picture cameras to locked, still, motion picture taking and continuous motion picture taking positions are known. The locked position corresponds to the out-of-use position of the camera whereas the continuous motion picture taking position relates to that condition of the transmission in which a motion picture is being taken without operation of the setting device to enable, e.g., the person who otherwise operates the camera to photograph himself. As said positions must be selectively attainable, the known setting devices of this kind are relatively complicated and bulky. This has not involved difficulties before because ample space was available for accommodating even complicated setting devices. The novel design of such motion picture cameras, however, involves a number of additional features in order to further facilitate the operation and to permit an improved shooting technique. These features include, e.g., an automatic adaptation of the lens stop to varying light conditions, a quick change of the number of frames per unit of time independently of the setting of a predetermined picture frequency, a quick change of the lens stop independently of the setting of specific stops at the lens itself and independently of the automatic adaptation of the lens stop to the changes of the exposure time, and devices for forming and operating a shutter diaphragm. If cameras embodying these features are not to exceed the usual dimensions, the above-mentioned setting devices must be accommodated within a very small space, which must not exceed the space required for accommodating the actuating handle itself. This handle should have the smallest size which still ensures a reliable operation. For this reason only operating pins, particularly in the form of push pins, are generally suitable whereas rotatable operating handles may only be used for preselecting the locked, motion picture, taking still (with instantaneous and time exposures) and self-photographing positions of the transmission. If possible, the actuating handle should be designed for the connection of a wire release in order to eliminate the need for a special wire release connection and the kinematic transmission between such connection and the transmission.

These manifold requirements and objects are met in a very simple and space-saving manner by the invention. Based on a transmission control for motion picture cameras having a longitudinally displaceable release pin and a preselector which serves for setting the transmission to locked, motion picture, still (with instantaneous and time exposure) and self-shooting positions and is peripherally adjustable around the release pin, the invention resides in that the preselector consists of a setting member which determines various end positions of the longitudinal displacement of the release pin, which has associated therewith a rotary part of the transmission, which carries stops, which in the predetermined end positions of the release pin either bypass or lie in the path of stops formed by the release pin.

Thus, it is already known to arrange a preselector to be rotatable around a release pin. In the known device, however, this relatively simple arrangement was followed by numerous additional transmission parts which were bulky and complicated so that arrangements of this kind did not yet provide a solution to the problem to restrict the required space virtually to the space occupied by the release pin and the preselector. This has been achieved according to the invention in that the release pin forms virtually only stops and that these stops are moved into and out of operative positions by the preselector.

In order to achieve this the rotating part of the transmission is constructed as a simple rotary disc, which carries on its end faces cam-shaped projections associated with stops carried by the release pin and displaceable in the direction at right angles to the axis of rotation of the disc and spaced from each other in the same direction, so that in the locked position of the transmission one of the cam-shaped projections of the disc engages one of the release stops to lock the disc against rotation and the transmission against operation, further, that the displacement of the stops required for setting the transmission for stills with instantaneous exposure results in the release of this cam-shaped projection and in the second stop lying after a full revolution of the disc in the path of a second cam-shaped projection to prevent a further rotation of the disc whereas in the motion picture taking positions both stops have been moved out of the orbit of the cam-shaped projections. If the cam-shaped projections are disposed on opposite end faces of the disc and are peripherally staggered by the cam thickness, whereas the stops consist of the prongs of a forked part of the release, which part embraces the disc on both sides, this will result in further simplifications and advantages which will be discussed for easier understanding in conjunction with an illustrative embodiment shown in the drawing. Above all, it is possible to utilize the periphery of the disc in conjunction with the actuation of the setting device by means of the wire release. In a further development of the invention this is effected in that a toothlike projection is arranged on the periphery of the disc diametrically opposite to the above-mentioned cam arrangement so that a stop moved into the path of this toothlike projection enables the disc to perform half a turn when the stop initially locking the disc has been rendered inoperative. When the stop associated with the toothlike projection of the periphery of the disc has thus been actuated by the wire release, the usual push-in movement of the wire release results in the release of the disc for half a turn. In the still position of the setting device this will result in an opening of the shutter for a time which corresponds to that of the push-in position of the wire release (so-called B position). The release of the wire release causes the stop associated with the toothlike projection on the periphery of the disc to return to the position in which it releases the disc so that the same performs another half turn because the abovementioned stop formed by the second prong of the forked part becomes now effective by engaging the second cam-shaped projection of an end face of the disc. Thus the release of the wire release causes the closing of the shutter in order to terminate a still picture of any desired duration.

If the forked part consists of an end portion carried by an actuating pin adjacent to the transmission, the above-mentioned possibility of forming this actuating pin as a push pin will be utilized because experience has shown that this form of the actuating handle involves the least shaking of a freely held camera body. At the same time it becomes possible to provide the actuating pin at the end opposite to the forked part with a tapped hole for receiving the wire release connection. In this case the actuating pin contains suitably a spring-cushioned stop in dependence of the actuation of the wire release, which stop can be moved to a position in which it lies in the path of the tooth-shaped projection of the periphery of the disc to limit the first half turn of the disc whereas the second half turn of the disc beginning after the release of the tooth-shaped projection is limited by the above-mentioned stop formed by the forked part. In order to enable the forked part to be arranged at such distances from the axis of rotation of the disc that one of the stops will lie or will not lie in the path of projections of the disc at any time, depending on the fact that these distances differ, a preferably annular detent bush is desirably used, which encloses the actuating pin and the peripherally variable setting of which positions the actuating pin and to the stops formed by the prongs of its forked part at those distances from the axis of rotation which are required to set the transmission of the motion picture camera selectively to locked, still, motion picture taking or continuous motion picture taking positions. In this way the above-mentioned requirement is met to restrict the space required for the setting device substantially to the space required for forming the actuating handle itself. As the disc may form a flywheel of the transmission and can thus be considered to belong to the transmission the object set forth is entirely achieved.

The drawing shows an illustrative embodiment of the invention.

FIG. 1 is a vertical sectional view showing the actuating pin, detent bush and the adjacent transmission disc.

FIG. 2 is a top plan view showing the inscription of the detent bush.

FIG. 3 is an end view taken in the direction opposite to that of FIG. 2.

FIG. 4 the periphery of the detent bush which has been developed into the plane of the drawing. FIGS. 5 to 8 are top plan views related to FIG. 1 and show components thereof in various positions.

FIG. 5 corresponds to the continuous motion picture taking position,

FIG. 6 to the motion picture taking position

FIG. 7 to the still position and

FIG. 8 to the locked position.

FIG. 9 shows again the position of FIG. 7 in conjunction with the stop, shown with dash lines, which is moved by the wire release.

FIG. 10 is a view partly in vertical section and partly in elevation showing a camera provided with such a transmission control.

FIG. 11 is a sectional view taken on line XI—XI of FIG. 10.

In FIGS. 1 to 3, 1 is a part of the camera housing or of the front wall of the motion picture camera. An aperture of this part receives the flanged bearing bush 2, in which the actuating handle 3, consisting of a push pin, is longitudinally displaceably guided, to vary its distance from the axis of rotation 4—4 (see also FIGS. 5 to 8) of a disc 5, which is operatively connected to the transmission and will hereinafter be termed "locking disc." This disc has on its end faces 51, 52 cam-shaped projections 53, 54, which are peripherally spaced from each other by the thickness of these cams measured in the same direction. Besides, the periphery 55 of the disc carriers at 56 a toothlike projection. As is particularly distinctly apparent from FIGS. 5 to 8 the push pin 3 is terminated at the end facing the transmission by two stop hooks 31, 32. As is shown by FIG. 3 the stop hooks 31, 32 are also offset relative to each other. The stop hook 31 is higher than the hook stop 32 by the thickness of one of the cam-shaped projections 53, 54 of the locking disc 5. Considered in the top plan view of FIGS. 5 to 8, the hook stops 31, 32 form a forked part, which embraces the locking disc 5, as is apparent from these figures.

At that end which is opposite to the forked part 31, 32 the push pin 3 has a hollow-conical recess and is provided with a screw thread so that the connecting piece of a wire release can be arranged at 33. That portion 34 of the push pin 3 which forms the hollow-conical screw thread 33 is followed by a further portion 35 which forms the opening 36, which accommodates the spring-cushioned stop 6 (see FIG. 9) with the spring plate 61, the spring 62 and the spring-cushioned stop pin 63, which is guided at 64 in the portion 35 of the push pin. In order to enable the push pin 3 to be positioned at the necessary different distances from the axis of rotation 4—4 the rotatable detent bush 7 is provided, which has a longitudinal slot 71, which receives the locking pin 8 of the portion 35 of the push pin 3. The detent bush 7 receives further the detent pin 73, which is spring-cushioned at 72 and has associated with it appropriately arranged detent recesses in the bearing flange of the flanged bearing bush 2 to facilitate the selection of those peripheral positions which are to be imparted to the detent bush 7 by means of the knob 9, to which it is non-rotatably connected at 91. In order to preclude a rotation of the push pin 3 the latter has a longitudinal groove 37, which is engaged by a screw 10. As is apparent from FIG. 2 the knob 9 carries designations of the set positions. The drawing indicates the locked position 92, the still position or position B for the wire release 93, the (normal) motion picture taking position 94 and the self-photographing position 95. These positions are also apparent from FIG. 4, which shows further that the longitudinal groove 71 of the detent bush 7 is not enlarged in the direction of the axis of rotation 4—4 in position 92. Such an enlargement 74 is provided, however, in the still position 93. A second enlargement of somewhat greater depth is provided in position 94 and an enlargement 76 of the same size is provided in the continuous motion picture taking position 95 but is so offset from the longitudinal groove 71 that a stop is formed at 77.

The mode of operation of the device described hereinbefore for the selective setting of the transmission, which has not been shown, to locked, still, motion picture taking and continuous motion picture taking positions is as follows:

The locked position shown in FIG. 8 and in FIGS. 1 and 3 is considered first. In this locked position the hook stop 32 of the push pin 3 lies in the path of the cam-shaped projection 53 of the locking disc 5 of the transmission because the push pin 3 has been moved to a corresponding position by means of the locking pin 8 and the detent bush 7 or the knob 9. When the detent bush 7 is peripherally rotated so that position 93 is at the top in FIG. 2, the locking pin 8 registers with the enlargement 74 of the groove 71 in FIG. 4. When the push pin 3 is now actuated by being pressed, the forked part 31, 32 assumes the position shown in FIG. 7 relative to the locking disc 5 or its axis of rotation 4—4. This means that the hook stop 32 releases the cam-shaped projection 53 of the locking disc 5 so that, as is shown in FIG. 1, this disc can begin a counterclockwise rotation 57 because in the position of the parts shown in FIG. 7 the hook stop 31 lies now in the path of the cam-shaped projection 54. This means that the shutter, which is controlled by the transmission, is opened and closed once so that a single still picture is taken. To take a second still picture the push pin 3 must be pressed again because the engagement of the locking pin 8 with the groove 71 has caused the push pin 3 to return to the position shown in FIG. 1. If the still picture is to be taken by means of the wire release rather than by pressing the push pin 3, the conditions shown in FIG. 9 will be obtained. The position of the hook stops 31, 32 relative to the disc 5, more particularly relative to its cam-shaped projections 53, 54, is the same as in FIG. 7. This means that the hook stop 31 becomes effective after a full turn of the disc 5 to prevent a further rotation thereof. On the other hand the spring-cushioned stop pin 63 lies in the path of the toothlike projection 56 of the locking disc 5 so that the disc 5 is already stopped after the first half turn after the actuation of the wire release so that the shutter of the camera is opened and remains open as long as the wire release is actuated. Only upon the release of the wire release does the spring plate 61 return to the position of FIG. 1 under the action of the spring 62. This causes the spring-cushioned pin 63 to release the locking disc 5 so that the latter performs the second half turn whereby the previously open shutter is closed. This enables the taking of still pictures during any desired exposure time with the aid of the wire release.

FIG. 6 shows the normal motion picture taking position 94, usually designated N, whereas the positions 92 and 93 described before have the brief designations O (OFF) and I B. FIG. 6 shows that the hook stops 31, 32 lie entirely outside the path of the cam-shaped projections 53, 54 of the disc 5 when the push pin 3 is actuated so that the locking disc 5 revolves as long as the push pin 3 is pressed. The same position of the parts is obtained in the continuous motion picture taking position shown in FIG. 5, with the difference that the stop 77 prevents an automatic disengagement of the locking pin 8 from the enlargement 76 of the groove 71. As a result, the stop 77 retains the push pin 3 in its set position by means of the locking pin 8 so that the transmission is and remains in operation without an action of the operator, who may now assume a position for being photographed so that he can photograph himself.

FIGS. 5 to 8 show that the hook stop 31 is extended at 38 in the opposite direction beyond the shape required to form a stop for the cam-shaped projection. This extension is embraced by a forked part 12. It has the function to return accessories of the kind mentioned hereinbefore to the initial position when this is desired. This is the case, e.g., in the locked position of FIG. 8, in which the arm 38 is effective to ensure that these means are in the normal position required before taking photographs in which these accessories are not used.

FIGS. 10 and 11 illustrate the overall structure of a camera provided with the device according to FIGS. 1 to 9. The disc 5 is apparent, which revolves with the transmission, as well as the square shaft 4 carrying the disc. The shaft 4 carries a gear 100 which is in mesh with the mating gear 101. The gear 101 is driven by the gear 102, which is concentric with and rigidly connected to the gear 103. The gear 103 is in mesh with the gear 104. The shaft carrying the gear 104 carries a further gear 105, which is in mesh with the large gear 106. The gear 106 is connected to a pinion, not shown, which is connected to the drive source of the camera, e.g., a spring motor or an electric motor. Such pinion drives are generally known and need not be illustrated. In this way the drive for the transmission for operating the claw, for the shutter and for the mirror of the reflex viewfinder is derived. This transmission will be briefly explained hereinafter. Thus, power is transmitted through parts 106, 105, 104, 103, 102, 101, 100 to the shaft 4. The gear 106 is also in mesh with the gear 112, the shaft of which has the gear 111 rigidly connected thereto. The gear 111 meshes with the gear 110 and the latter with the gear 113. This drives the barrel 114 of the upper film reel. The gear 109 is also driven by the gear 106 through the intermediary of the above-mentioned gears 112, 111 and 110 and meshes with the gear 108. The gear 108 drives the barrel 116 of the second barrel 117 which serves for winding the exposed film. The film itself is apparent at 118 after it has been unwound from the barrel 114. It passes through the film guide path 119 and is deflected by guide rollers 120. The exposed end is wound up on the reel 117, as has already been mentioned. A film pressure plate 121 retains the film in position. In addition to the gear 100 the shaft 4 carries a helical gear 122 (see FIG. 11), which is in mesh with the mating helical gear 123. The helical gear 123 is arranged on the vertical shaft 124, which carries the crank disc 125. The crank pin 126 of the crank disc 125 drives the connecting rod 127, which reciprocates the mirror 128. The mirror 128 has an aperture 129, which is either in or outside of the optical axis 130—130 of the lens 131. Thus the mirror acts as a shutter for the camera so that the light admitted through the lens 131 falls on that part of the film which is just exposed at the exposing aperture 134 of the film guide 119. To impart to the film 118 the necessary periodic movement the shaft 4 carries in addition to the above-mentioned gear 100 and the helical gear 122 the eccentric disc 135, which is provided with the eccentric ring 136 having the straight guide 137 connected thereto. The straight guide 137 is provided for this purpose with a slot 138 receiving the stationary pin 139 and terminates in a beak 140, which forms a claw for the perforation 141 of the film 118. Owing to the eccentric drive 135, 136 and the straight guide 137—139 the claw beak 140 moves along an approximately rectangular path. This results in the desired intermittent feeding of the film and causes an appropriate area of the film to register with the exposing aperture 134 for exposure. In those positions in which the apertures 129 and 134 are not in register the mirror surfaces of the mirror 128 are in the optical axis 130—130 of the lens 131 so that the path of rays 142 of the lens is deflected into the path of rays 143. A reflex viewfinder of known type is disposed in the path of rays 143 so that the subject can be directly seen in this reflex viewfinder.

What is claimed is:

1. A control arrangement for the transmission for moving the film and operating the shutter in motion picture cameras, said transmission control arrangement comprising, in combination, a release member for the transmission, said release member being adapted to release the operation of the transmission in one end position and to block the operation of the transmission in the other end position, one end of said release member consisting of a forked part, the prongs of said forked part being relatively spaced in the direction of displacement of said release member and transversely thereto, said prongs being long and short owing to their spacing in the direction of displacement, a transmission part associated with the release member, said transmission part consisting of a disc, projections carried by said disc at the rim thereof on both end faces, said projections being peripherally spaced from each other, said forked part embracing the rim of said disc, a preselector for serial exposures, stills with instantaneous and time exposures, self-shots and a locked position, said projections being so related to each other that in the locked position of the preselector one projection of the disc engages a projection formed by said long prong in the direction of rotation of the disc, that in the still position of the release member the projection formed by the long prong lies outside of the orbit of said end face projection of the disc and the projection formed by the short prong lies after one turn in the path of the other end face projection of the disc, and that in the serial exposure position of the preselector the projections formed by the long and short prongs lie outside the orbit of the end face projections of the disc, a preselector said preselector being adapted to move the release member and its forked part to said positions in which either the short prong or the long one or neither of them lies in the path of one or the other of the two end face projections of the disc.

2. A control arrangement as set forth in claim 1, said release member consisting of a push button, said preselector consisting of an annular member surrounding the push button a projection carried by the release member at the end opposite to the forked part, said annular member having a peripherally extending, slot-shaped aperture, which is adapted to receive the last-mentioned projection, said annular member having further apertures communicating with the peripherally extending aperture and extending in the direction of displacement of said release member, said further apertures having different lengths, a spring adapted to urge the projection of the release member which is received in the peripheral aperture of said preselector into one of the further apertures and to move the forked part of the release member into one of the end positions determined by the length of the further apertures or an edge of the slot-shaped peripheral apertures.

3. A control arrangement as set forth in claim 1, said release member consisting of a push button, said preselector consisting of an annular member surrounding the push button a projection carried by the release member at the end opposite to the forked part, said annular member having a peripherally extending, slot-shaped aperture, which is adapted to receive the last-mentioned projection, said annular member having further apertures communicating with the peripherally extending aperture and extending in the direction of displacement of said release member, said further apertures having different lengths, a spring adapted to urge the projection of the release member which is received in the peripheral aperture of said preselector into one of the further apertures and to move the forked part of the release member into one of the end positions determined by the length of the further apertures or an edge of the slot-shaped peripheral apertures, the last of said further openings being peripherally spaced from the end of said peripheral slot-shaped opening, said spacing being such that an edge-shaped stop is formed, said edge stop being adapted to prevent said release member projection from entering said peripheral slot-shaped aperture under the action of said spring and to maintain the release member automatically in the position in which the transmission is running until the preselector is moved to the position in which the edge stop releases the release member projection for entering the peripheral slot-shaped aperture of the preselector, the other end of said peripheral aperture consisting of a slot terminated in the form of a sac.

4. A control arrangement as set forth in claim 1, said release member having a central opening, said opening being enlarged in the shape of a hollow funnel at that end of the release member which is opposite to the forked part, screw threads cut into said hollow funnel, said funnel-shaped screw thread being adapted to receive a wire release, a pin received and guided in that part of said opening which is adjacent to the forked part, said pin being adapted to protrude beyond that end of the release member which is adjacent to the forked part when the wire release has been actuated and to be entirely received in the release member when the wire release has been released, a further projection on said disc extending radially with respect to the axis of rotation of said disc and adapted to engage the wire release actuated pin in the release member after a rotation through 180° so that the disc opens the shutter whereas an end face projection of the disc engages the short prong after a rotation of the disc through 360° so that the latter closes the shutter after response to a release of the pin by the release member.

5. A control arrangement as set forth in claim 1, said release member consisting of a push button, said preselector consisting of an annular member surrounding the push button, a projection carried by the release member at the end opposite to the forked part, said annular member having a peripherally extending, slot-shaped aperture, which is adapted to receive the last-mentioned projection, said annular member having further apertures communicating with the peripherally extending aperture and extending in the direction of displacement of said release member, said further apertures having different lengths, a spring adapted to urge the projection of the release member which is received in the peripheral aperture of said preselector into one of the further apertures and to move the forked part of the release member into one of the end positions determined by the length of the further apertures or an edge of the slot-shaped peripheral apertures, the last of said further apertures being peripherally spaced from the end of said peripheral slot-shaped opening, said spacing being such that an edge-shaped stop is formed, said edge stop being adapted to prevent said release member projection from entering said peripheral slot-shaped aperture under the action of said spring and to maintain the release member automatically in the position in which the transmission is running until the preselector is moved to the position in which the edge stop releases the release member projection for entering the peripheral slot-shaped aperture of the preselector, the other end of said peripheral aperture consisting of a slot terminated in the form of a sac, said release member having a central opening, said opening being enlarged in the shape of a hollow funnel at that end of the release member which is opposite to the forked part, screw threads cut into said hollow funnel, said funnel-shaped screw thread being adapted to receive a wire release, a pin received and guided in that part of said opening which is adjacent to the forked part, said pin being adapted to protrude beyond that end of the release member which is adjacent to the forked part when the wire release has been actuated and to be entirely received in the release member when the wire release has been released, a further projection on said disc extending radially with respect to the axis of rotation of said disc and adapted to engage the wire release actuated pin in the release member after a rotation through 180° so that the disc opens the shutter whereas an end face projection of the disc engages the short prong after a rotation of the disc through 360° so that the latter closes the shutter after response to a release of the pin by the release member.

6. In a motion picture camera, in combination, rotary means forming part of the transmission of the camera; first stop means carried by said rotary means for rotary movement therewith; push button means; support means guiding said push button means for axial movement in direction towards and away from said rotary means; manually operable selecting means cooperating with said push button means for selecting one of a plurality of axial positions thereof; by axial movement of said push button in direction towards and away from said rotary means; and second stop means carried by said push button means and directly engaging said first stop means for providing different types of camera operation in the several axial positions of said push button means.

7. In a motion picture camera, in combination, rotary means forming part of the transmission of the camera; first stop means carried by said rotary means for rotary movement therewith; push button means; support means guiding said push button means for axial movement in direction towards and away from said rotary means; manually operable selecting means cooperating with said push button means for selecting one of a plurality of axial positions thereof by axial movement of said push button in direction towards and away from said rotary means; and second stop means carried by said push button means and directly engaging said first stop means for providing different types of camera operation in the several axial positions of said push button means, said push button means being axially movable along a predetermined axis and said rotary means having an axis of rotation normal to said predetermined axis.

8. In a motion picture camera, in combination, rotary means forming part of the transmission of the camera; first stop means carried by said rotary means for rotary movement therewith; push button means; support means guiding said push button means for axial movement; manually operable selecting means cooperating with said push button means for selecting one of a plurality of axial positions thereof; and second stop means carried by said push button means and cooperating with said first stop means for providing different types of camera operation in the several axial positions of said push button means, one of said positions of said push button means placing said second stop means in a position out of the path of movement of said first stop means and said selecting means cooperating with said push button means when the latter is in said one position for releasably retaining said push button means in said one position so that in said one position of said push button means continuous camera operation is provided without manual engagement of the camera by the operator so that the operator may photograph himself.

References Cited in the file of this patent

UNITED STATES PATENTS

| | | |
|---|---|---|
| 2,413,443 | Frankel | Dec. 31, 1946 |
| 2,462,302 | Bolsey | Feb. 22, 1949 |

FOREIGN PATENTS

| | | |
|---|---|---|
| 499,728 | Great Britain | Jan. 27, 1939 |
| 619,851 | Great Britain | Mar. 16, 1949 |